April 4, 1961  C. H. PUCKERING  2,977,744
TEETH FOR SWEEPRAKES OR THE LIKE

Filed May 1, 1958  2 Sheets-Sheet 1

INVENTOR.
Charles H. Puckering.
BY
Fishburn and Gold
ATTORNEYS.

April 4, 1961 C. H. PUCKERING 2,977,744
TEETH FOR SWEEPRAKES OR THE LIKE
Filed May 1, 1958 2 Sheets-Sheet 2
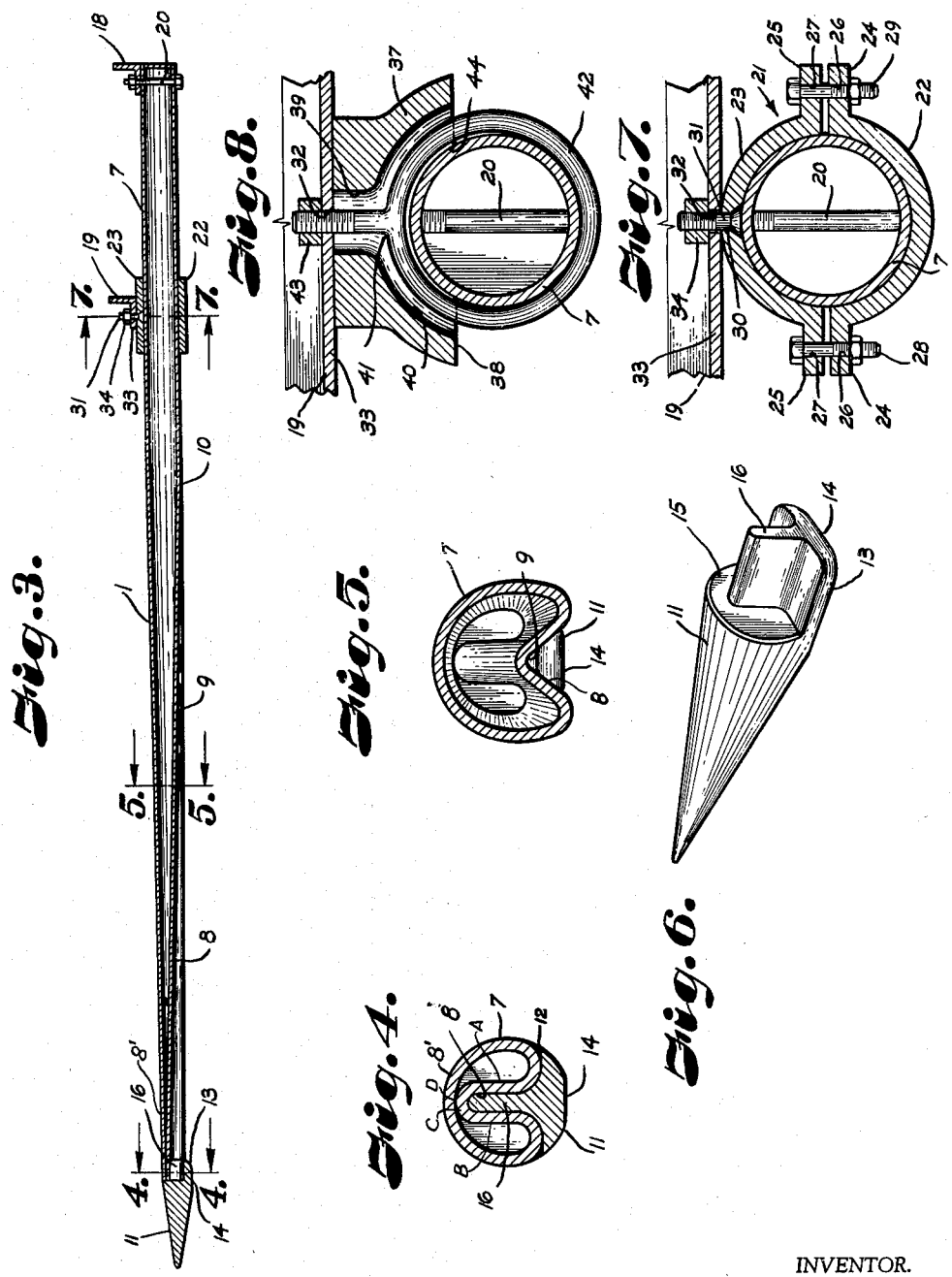
INVENTOR.
Charles H. Puckering.
BY
Fishburn & Gold
ATTORNEYS.

United States Patent Office 2,977,744
Patented Apr. 4, 1961

2,977,744

TEETH FOR SWEEPRAKES OR THE LIKE

Charles Henry Puckering, Fargo, N. Dak., assignor, by mesne assignments, to West Fargo Manufacturing Company, West Fargo, N. Dak., a corporation of North Dakota Filed May 1, 1958, Ser. No. 732,345

2 Claims. (Cl. 56—400)

This invention relates to teeth for sweeprakes, stackers, and the like, and more particularly for a steel tooth for such rakes and stackers for attachment to and operation by tractors and other hay handling apparatus.

I have found that with the development of hydraulic lifting equipment for tractors, sweeprakes and stacker mechanism for moving and piling hay in the field and elsewhere, the present day wooden teeth used on this equipment are impractical due to the inherent weakness of such wooden teeth because the present day wooden teeth and even those made of steel of which applicant is aware in whole or in part are unable to stand up under the force and power capable of being exerted by most farm tractors, commonly used in the haying operation.

It is the principal object of the present invention to provide a tooth for sweeprakes and stackers made of steel and so formed to provide strength and rigidity therein which will withstand the strains and stresses imposed thereon with present day farm equipment.

Other objects of the present invention are to provide a steel tip for the teeth to give it a wearing sole on the bottom to provide longer life to the tooth; to provide a tooth depressed at the leading end into a groove and reducing it in depth toward the back and forming a tube by tapering so that it has the tapered leading end to increase the strength to a point which provides strength when light gauge material is used; to provide a tooth which may be attached to the rake or stacker having a rear anchoring member or cross bar and a forward anchoring position spaced from the rear anchoring position; to provide adjustable means for the forward anchoring means of the teeth to the rake; to provide a sole on the tip of the tooth and forming of the tip into the tapered end of the tooth for longer life thereof, and to provide a device of this character simple and economical to manufacture.

In accomplishing these and other objects of the invention I have provided improved details of structure the preferred forms of which are shown on the accompanying drawings wherein:

Fig. 3 is a longitudinal cross-sectional view of the tooth.

Fig. 4 is an enlarged transverse cross-sectional view taken on a line 4—4, Fig. 3.

Fig. 5 is an enlarged cross-sectional view taken on a line 5—5, Fig. 3.

Fig. 6 is an enlarged perspective view of the tip of the tooth showing the wearing sole thereof.

Fig. 7 is an enlarged cross-sectional view showing the fastening means at the forward fastening position of the tooth to the rake taken on a line 7—7, Fig. 3.

Fig. 8 is an enlarged cross sectional view of a modified form of fastening of the teeth to the forward anchoring position of the rake.

Figure 1:
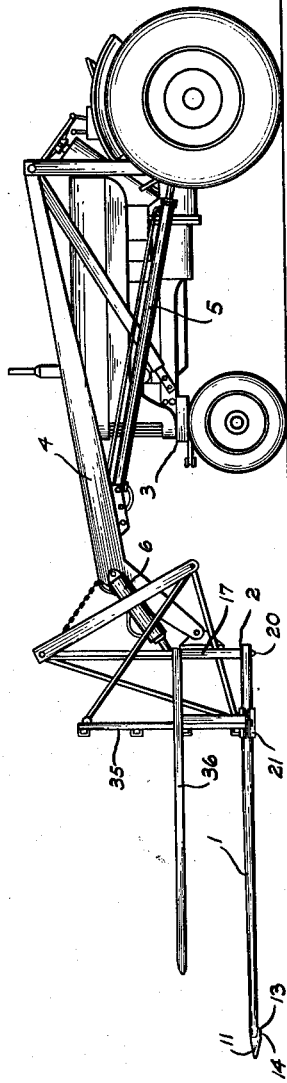
Fig. 1 is a side view of the sweeprake or stacker shown attached to a tractor.

Referring more in detail to the drawings.

1 designates a tooth embodying the features of my invention shown attached to a rake or stacker 2, which is in turn attached to a tractor 3 by booms or the like 4 and operated through hydraulic cylinders as indicated at 5 and 6 in accordance with the usual practice.

The tooth 1 is formed from a piece of steel tubing or the like as indicated at 7 and is formed by crimping or depressing longitudinally to form a groove 8 at the tapered end 8' thereof as illustrated in Fig. 4. Crimping to form the taper results in the groove forming spaced side walls A and B with the walls connecting indicated at C to contact the opposite wall D of the tubing 7 (Fig. 4). The groove 8 is tapered rearwardly as indicated at 9 (Figs. 3 and 5) gradually to the rear of the tubes and ends at the point indicated at 10 (Fig. 3).

Figure 2:
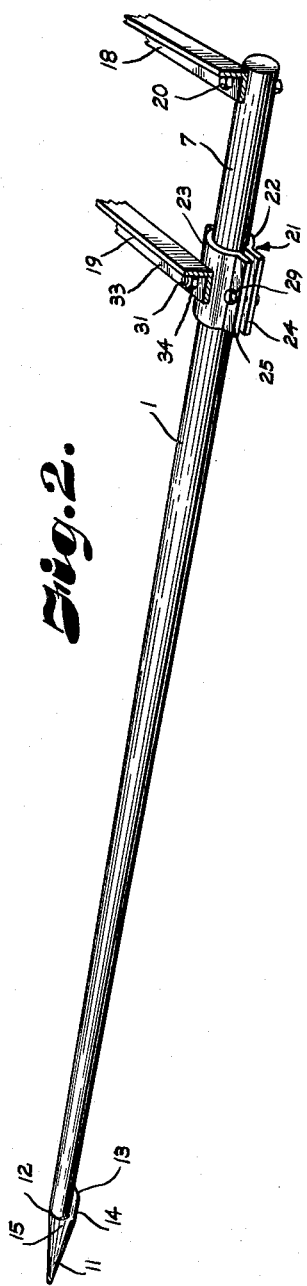
Fig. 2 is an enlarged perspective view of the tooth showing it attached to the cross members at the rear of the rake.

A metal tip 11 is provided for engaging in the crimped end of the tooth 1 and is secured therein by welding or other suitable means indicated at 12 (Fig. 2). The tip 11 is substantially cone shaped and has an extension 13 which is flattened as indicated at 14 (Fig. 4) and forms the bottom surface or sole of the tip. The rear end of the cone shaped tip is substantially cylindrical as indicated at 15 (Fig. 6) and extending outwardly therefrom and joining with the extension 13 is a member or arm 16. The tip 11 is molded or cast into one piece and extensions 13 and 16 being integral with the body of the tip and each other are substantially T-shaped and the arm 16 is adapted to engage in the groove 8 of the forward end of the tooth 1 and when welded therein the bottom 14 provides a wearing sole for the tip which provides longer life thereto.

The sweeprake proper consists of a rear end frame 17 having a horizontal cross member 18 at the rear end thereof and forming the rear anchoring position and having an angle shaped horizontal cross member 19 spaced forwardly of the first anchoring position for the teeth. The rake includes a plurality of teeth and they are fastened to the rear cross member 18 by a bolt or the like 20 extending through openings in the rear end of the teeth. For securing the teeth to the forward anchoring portion of cross member 19 I provided a saddle member or clamp 21 comprised of two substantially semi-cylindrical members 22 and 23 having laterally extending ears or flanges 24 and 25 provided with openings 26 and 27 respectively for receiving bolts 28 and 29 for clamping the semi-cylindrical members around the tooth 1. The clamping members are elongated as illustrated in Fig. 3 to provide a longer bearing surface for the teeth. The upper cylindrical member 23 is provided with an opening 30 for receiving a bolt or the like 31 adapted to extend through an opening 32 in the horizontal flange portion 33 of the cross member 19. A nut 34 is provided for the threaded end of the bolt 31 to hold the clamping member 21 thereto.

It will be obvious as many teeth as desired may be provided for the rake and while I have only described the attachment of one tooth to the cross members, they are all attached in the same manner. It will further be obvious that the forward anchor position may be at different positions on the tooth as desired.

In Fig. 1, I have shown the sweeprake as having a push-off gate as indicated at 35 and suitable bracing, the gate to be operated in the usual manner (not shown). The cylinder 6 is provided for tilting of the rake also as the usual practice. The cylinder 5 is utilized for raising and lowering the rake as also through the boom 4 is the usual practice. The side members 36 show the usual form of keepers on the side of the rake for preventing the hay or other material from dropping over the side of the rake.

Fig. 8 represents a modified form of attachment of the tooth 1 to the cross member 19 and comprises a saddle member 37 having a semi-cylindrical portion as indicated at 38 for engaging over the top of the tooth 1. The saddle member is provided with a vertical slot 39 through its upper portion which terminates in a groove 40 in the inner semi-cylindrical surface of the saddle member. An eye-bolt 41 is provided for attachment of the tooth to the cross member 19 and includes a cylindrical ring portion 42 which engages over the tooth 1 and the bolt portion 41 extends through the groove 39 and the opening 32 in the horizontal portion of the member 19. The bolt 41 has its end threaded and adapted to receive a nut 43 for holding the saddle member and tooth to the cross member.

It will be obvious that with the groove 40 in the saddle member the eye-bolt may be utilized for different size teeth or engaged upon the tooth at different portions so that when the nut is tightened the upper portion of the ring will be drawn into the groove and the tooth be held tight against the cylindrical portion 44 of the saddle member.

It will be obvious that other forms of attachment of the teeth of the frame to the rake may be utilized without departing from the spirit of my invention. The forms I have shown are merely representative.

It will be further obvious by providing the groove or tapered depressed portion in the tubing it will greatly strengthen the same and smaller gauge tubing as well as smaller size tubing may be utilized without bending of the teeth in handling heavy material. I have found that such steel teeth will stand up under much more strains than teeth heretofore utilized and particularly the wooden teeth which are now so commonly used. The present tooth will eliminate annoying and costly shut-downs and the replacement of teeth during the hay operations and reduce the cost of such teeth with relation to the amount or tonnage of material handled.

It will further be obvious that with my improvement a stronger and better attachment of the metal tip with the deep indentations therein will strengthen the overhanging portion of the tube in the area from its head end to its forward anchoring position.

What I claim and desire to secure by Letters Patent is:

1. In a sweeprake having a frame for supporting a plurality of elongated teeth in extended position, said teeth being tapered inwardly toward the leading ends thereof, each tooth comprising: an elongated tube composed of a light gauge metal wall, an elongated portion of said wall defining a grooved portion on said tube, said grooved portion having spaced sidewalls and increasing in depth as said leading end is approached, said sidewalls connecting on the line of greatest depth of said groove and terminating at said leading end adjacent the inside surface of the tube wall opposite thereto; a tip for said tooth, said tip being substantially cone-shaped and having an extension on the large end thereof for engaging in said leading end, means securing said tip in said leading end; and means securing said tube on said frame.

2. In a sweeprake having a frame for supporting a plurality of elongated teeth in extended position; each tooth comprising, an elongated tube composed of a light gauge sheet metal wall having one portion adjacent one end adapted to be secured to said frame with the other portion extending forwardly from said frame, said other portion of the tube having an upper part semi-circular along substantially the length thereof in cross section with the radius of said semi-circular cross section diminishing toward the leading end of said tooth, said tube having a wall portion defining a groove extending inwardly from the bottom of said tube and along the length of said tube substantially from said frame to the leading end of said tube, said groove defining wall being integral with and extending from the sides of the semi-circular portion of said tube, said groove increasing in depth as said leading end is approached and terminating at said leading end adjacent the inside surface of said upper half, a tip for said tooth, said tip being substantially cone-shaped and engaging said tooth at said leading end, a shoe on said tip engaging the bottom of said tube adjacent said leading end, an integral upstanding rib on said shoe extending rearwardly of said tip into said groove, means securing said tip to said tube, and means securing said tube on said frame.

References Cited in the file of this patent

UNITED STATES PATENTS

| | | |
|---|---|---|
| 49,800 | Sprout | Sept. 5, 1865 |
| 572,935 | Topping | Dec. 8, 1896 |
| 857,412 | Nelson | June 18, 1907 |
| 1,269,393 | Cope | June 11, 1918 |
| 1,604,590 | McNulty | Oct. 26, 1926 |
| 1,737,214 | Brown | Nov. 26, 1929 |
| 1,850,275 | Zifferer | Mar. 22, 1932 |
| 2,679,721 | Johnson | June 1, 1954 |
| 2,744,706 | Gerdy | May 8, 1956 |
| 2,826,033 | Stormont | Mar. 11, 1958 |
| 2,862,349 | Reiten | Dec. 2, 1958 |

FOREIGN PATENTS

| | | |
|---|---|---|
| 626,311 | France | May 9, 1927 |